United States Patent
Renault et al.

(10) Patent No.: US 9,505,328 B2
(45) Date of Patent: Nov. 29, 2016

(54) VEHICLE SEAT AND METHOD FOR MAKING SAME

(75) Inventors: Thierrry Renault, Vernon (FR); Amit Kulkarni, Troy, MI (US)

(73) Assignee: FAURECIA SIEGES D'AUTOMOBILE, Nanterre (FR)

( * ) Notice: Subject to any disclaimer, the term of this patent is extended or adjusted under 35 U.S.C. 154(b) by 308 days.

(21) Appl. No.: 13/392,005

(22) PCT Filed: Jul. 23, 2010

(86) PCT No.: PCT/FR2010/051562
§ 371 (c)(1),
(2), (4) Date: Feb. 23, 2012

(87) PCT Pub. No.: WO2011/027057
PCT Pub. Date: Mar. 10, 2011

(65) Prior Publication Data
US 2012/0169103 A1    Jul. 5, 2012

(30) Foreign Application Priority Data
Sep. 3, 2009  (FR) .................................... 09 56014

(51) Int. Cl.
*A47C 7/02* (2006.01)
*B60N 2/68* (2006.01)
*B60N 2/22* (2006.01)

(52) U.S. Cl.
CPC ............... *B60N 2/686* (2013.01); *B60N 2/22* (2013.01); *B60N 2/682* (2013.01)

(58) Field of Classification Search
CPC .......... A47C 7/46; A47C 5/12; A61G 13/12; B60N 2/68
USPC ............ 297/452.31, 452.36, 452.65, 452.18, 297/452.14
See application file for complete search history.

(56) References Cited

U.S. PATENT DOCUMENTS

| | | | |
|---|---|---|---|
| 5,100,204 A | 3/1992 | Makihara et al. | |
| 7,290,837 B2 * | 11/2007 | Sugiyama et al. | 297/452.55 |
| 7,731,292 B2 * | 6/2010 | Ishijima et al. | 297/452.18 |
| 8,894,154 B2 * | 11/2014 | Kulkarni et al. | 297/452.1 |
| 2008/0038569 A1 * | 2/2008 | Evans et al. | 428/474.9 |
| 2009/0208915 A1 | 8/2009 | Pugh | |
| 2012/0306253 A1 * | 12/2012 | Seibold et al. | 297/354.1 |

FOREIGN PATENT DOCUMENTS

| | | |
|---|---|---|
| DE | 40 36 462 A1 | 11/1990 |
| DE | 42 38 549 A1 | 5/1994 |
| DE | 197 57 060 A1 | 6/1999 |
| WO | WO-2008/019981 A1 | 2/2008 |

OTHER PUBLICATIONS

Search Report and Written Opinion for related International Application No. PCT/FR2010/051562; report dated Feb. 14, 2011.
Search Report and Written Opinion for related French Application No. FR09 56014; report dated Mar. 30, 2010.

* cited by examiner

*Primary Examiner* — David R Dunn
*Assistant Examiner* — Alexander Harrison
(74) *Attorney, Agent, or Firm* — Miller, Matthias & Hull LLP (57) ABSTRACT

The invention relates to a vehicle seat comprising a seat portion and a backrest connected to the seat portion by a hinge mechanism. A seat element selected from among the backrest and the seat portion comprises a shell, which is made of a plastic material and the side edges of which are overmolded onto composite reinforcement inserts. Each of the inserts comprises a core perpendicular to the medium plane of the seat element, and two side flanges parallel to the medium plane of the seat element. The insert is formed by assembling two composite parts having an L-shaped cross-section and forming a portion of the core and one of the side flanges of the insert.

12 Claims, 10 Drawing Sheets

VEHICLE SEAT AND METHOD FOR MAKING SAME

CROSS-REFERENCE TO RELATED APPLICATIONS

This application is a 35 USC §371 U.S. national stage filing of International Patent Application No. PCT/FR2010/051562 filed on Jul. 23, 2010, which claims priority under the Paris Convention to French Patent Application No. 09 56014, filed on Sep. 3, 2009.

FIELD OF THE DISCLOSURE

The invention relates to vehicle seats and their manufacturing methods.

BACKGROUND OF THE DISCLOSURE

More specifically, the invention relates to a vehicle seat comprising a seat portion and a backrest connected to the seat portion by at least one hinge mechanism to allow adjusting the tilt of the backrest and to lock the backrest into the selected tilt angle, the seat comprising a seat element chosen from among the backrest and the seat portion, said seat element extending along a mean plane and having two sides, and said seat element comprising:
  a shell of plastic material, having two lateral edges which respectively extend along the sides of the seat element between a first end near the hinge mechanism and a second end further away from the hinge mechanism,
  at least one rigid insert of composite material which is overmolded by one of the two lateral edges of the shell of plastic material, said rigid insert extending for a certain length from the first end of said corresponding lateral edge, said insert comprising resistant fibers embedded in a synthetic matrix, and said insert presenting a U-shaped cross-section having a core substantially perpendicular to the mean plane of the seat element and two side flanges substantially parallel to the mean plane of the seat element, said core being connected to said hinge mechanism at the first end of the corresponding lateral edge.

Document US-A-2008/038569 describes an example of a seat of this type.

SUMMARY OF THE DISCLOSURE

One object of the invention is to improve the seats of this type, and in particular to improve the mechanical strength.

In the invention, a seat of this type is characterized by said insert being formed of two composite parts integrally attached to each other, each of said two composite parts having a L-shaped cross-section and comprising a core portion that is part of the core of the insert and one of the flanges of the insert, each of the two core portions extending for substantially the entire height of the core of the insert.

Creating the inserts in two composite parts ensures the optimum quality of the composite material in the two side flanges of each insert, which are the portions subjected to the most mechanical stress, particularly in an accident involving the vehicle. This avoids any rearrangement of the resistant fibers in these two parts during the hold molding process for the composite parts, as will be explained in more detail below.

In some embodiments of the seat of the invention, one or more of the following arrangements may be used:
  the two composite parts are integrally attached to each other by the shell of plastic material, which is overmolded onto said two composite parts;
  the two composite parts are integrally attached to each other by fusion along a joining line between the core portions of the two composite parts;
  the two composite parts each has an overlapping strip, the two strips being superimposed one atop the other and assembled together by fusion along said joining line;
  the two composite parts are integrally attached to each other by at least one composite sheet which at least partially covers the core portions of the two composite parts and the side flanges of the insert;
  the seat additionally comprises at least one metal plate which at least partially covers the core portions of the two composite parts and which is integrally attached to said two composite parts, said metal plate being overmolded by the corresponding lateral edge of the shell of plastic material and being connected to the hinge mechanism;
  the metal plate comprises recesses facing the two core portions of the two composite parts and is integrally attached to each of said core portions by the riveting formed by the penetration of the material of these core portions into said recesses;
  the metal plate at least partially covers the core and the two side flanges of the insert and is also integrally attached to said side flanges by the riveting formed by the penetration of the material of these side flanges into recesses presented by the metal plate facing said side flanges;
  the metal plate is integrally attached, by a screwing arrangement, to a rigid tab that is part of the hinge mechanism, said metal plate having at least one support surface not encased by the shell of plastic material, and the tab of the hinge mechanism being supported on said support surface.

Another object of the invention is a method for manufacturing a seat as defined above, comprising at least the following steps:
  (a) a composite part manufacturing step, during which the two composite parts are formed by hot pressing,
  (b) an assembly step, during which the two composite parts are assembled together by their respective core portions.

In various embodiments of the method of the invention, one or more of the following arrangements may be used:
  during the composite part manufacturing step (a), each composite part is manufactured by shaping a blank comprising superimposed composite sheets, by pressing the blank in a hot mold which comprises two mold parts which can be moved towards each other in a pressing direction, the side flange of the composite part molded in this manner being substantially perpendicular to said pressing direction;
  during the assembly step (b), the two composite parts are arranged so that their core portions are partially superimposed in a certain overlapping area and said core portions are fused together in said overlapping area by pressing in a hot mold;
  during the assembly step (b), the two composite parts are superimposed with a metal plate which comprises recesses and which at least partially covers said two composite parts, and the two composite parts are assembled together while the material of the composite parts flows into recesses in the metal plate, by pressing in a hot mold.

BRIEF DESCRIPTION OF THE DRAWINGS

Other features and advantages of the invention will be apparent from the following description of one of its embodiments and some of its variants, provided as non-limiting examples, and the attached drawings.

In the drawings.

The same references are used to denote the same or similar elements in the different figures.

DETAILED DESCRIPTION OF THE DISCLOSURE

Figure 1:
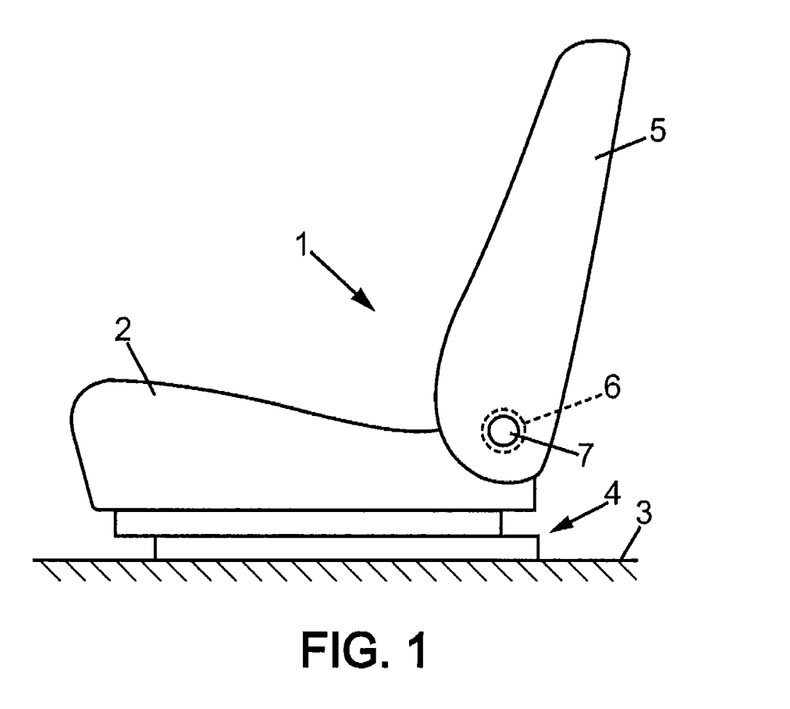
FIG. 1 is a side view of a seat according to one embodiment of the invention.

FIG. 1 represents a seat 1 of an automotive vehicle, for example a front seat. This seat 1 comprises a seat portion 2 which is attached to the floor of the vehicle, for example by means of rails 4 which allow adjusting the longitudinal position of the seat 1. The seat portion 2 supports a backrest 5 which may be assembled to pivot on the seat portion 2 by means of at least one hinge mechanism 6 which is controlled for example by a rotating handle 7 to adjust the tilt of the backrest 5. In the example considered here, there are two hinge mechanisms 6, arranged on each side of the seat and synchronously controlled by the handle 7 (see FIG. 2).

Figure 2:
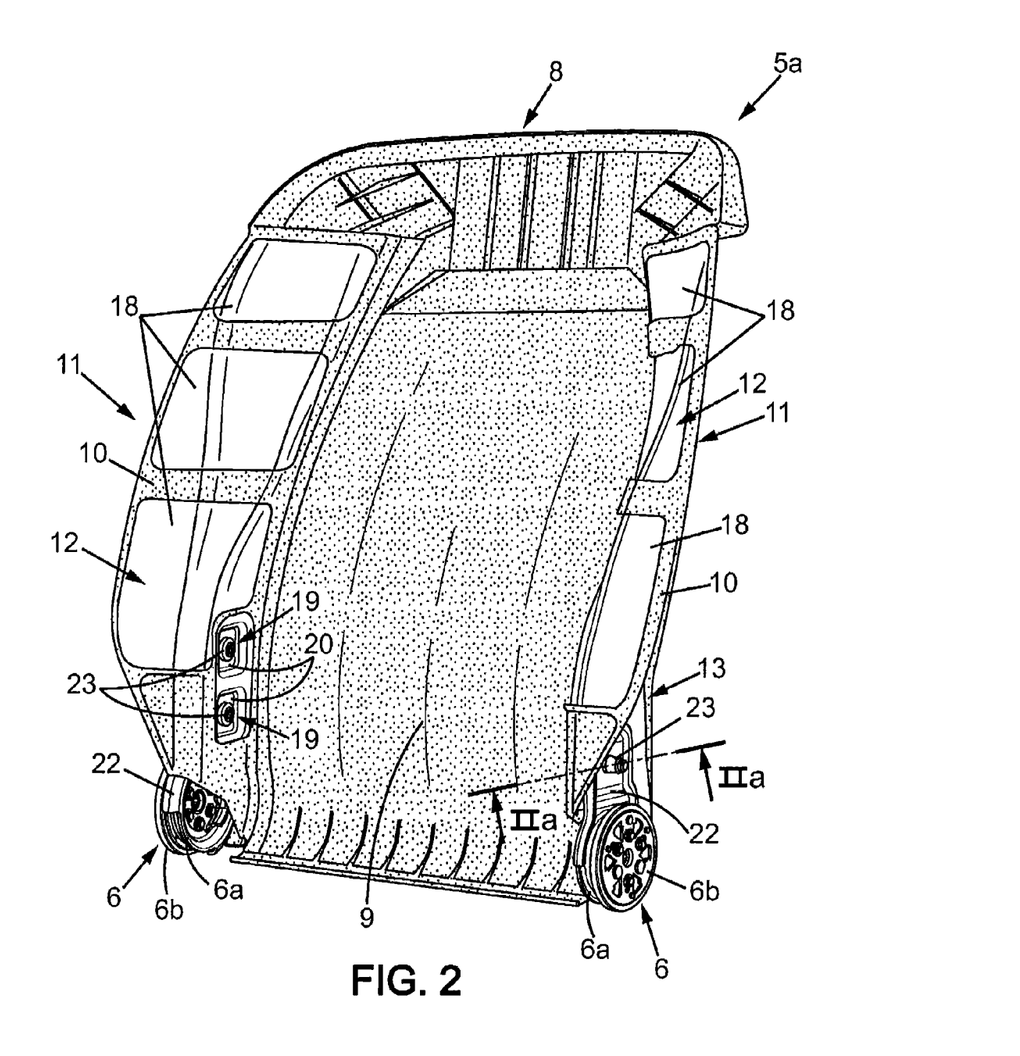
FIG. 2 is a perspective view of the structural framework of the backrest of the seat of FIG. 1.

The backrest 5 of the seat comprises a supporting framework 5a which is represented in FIG. 2, this framework normally being covered with foam padding which is covered on the front side with cloth, leather, or some other material.

Here, the framework 5a of the backrest comprises a shell 8 of plastic material, particularly of polyamide and for example of polyamide 6.

As can be seen in FIG. 2, this shell 8 of plastic material may comprise, for example, a bottom 9 parallel to the mean plane of the backrest 5 and two substantially vertical lateral edges 10, forming the two sides of the backrest 5.

Figure 2A:
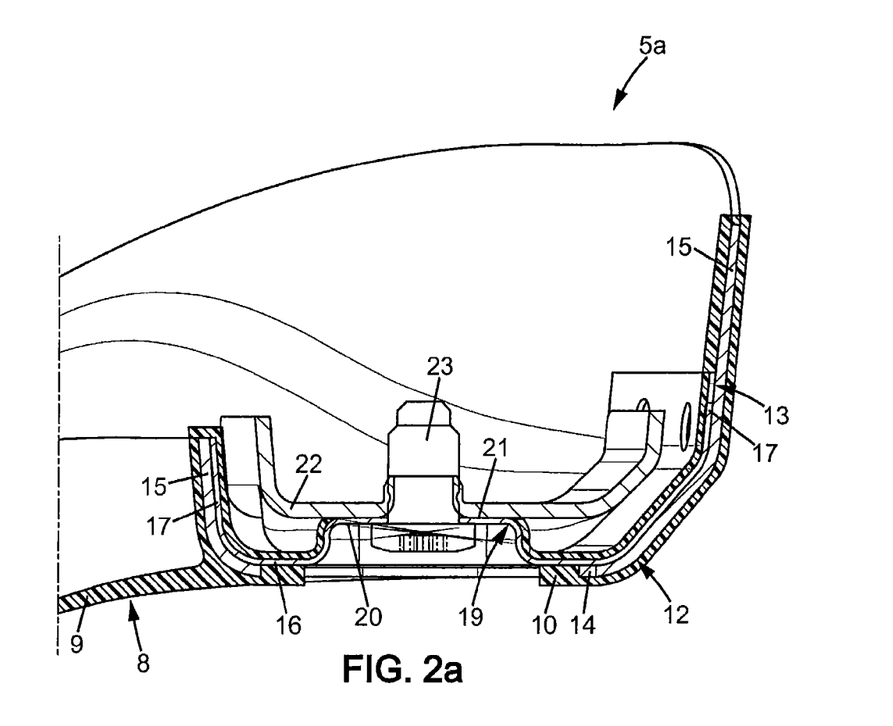
FIG. 2a is a cross-sectional view along the line IIa-IIa in FIG. 2.
Figure 3:
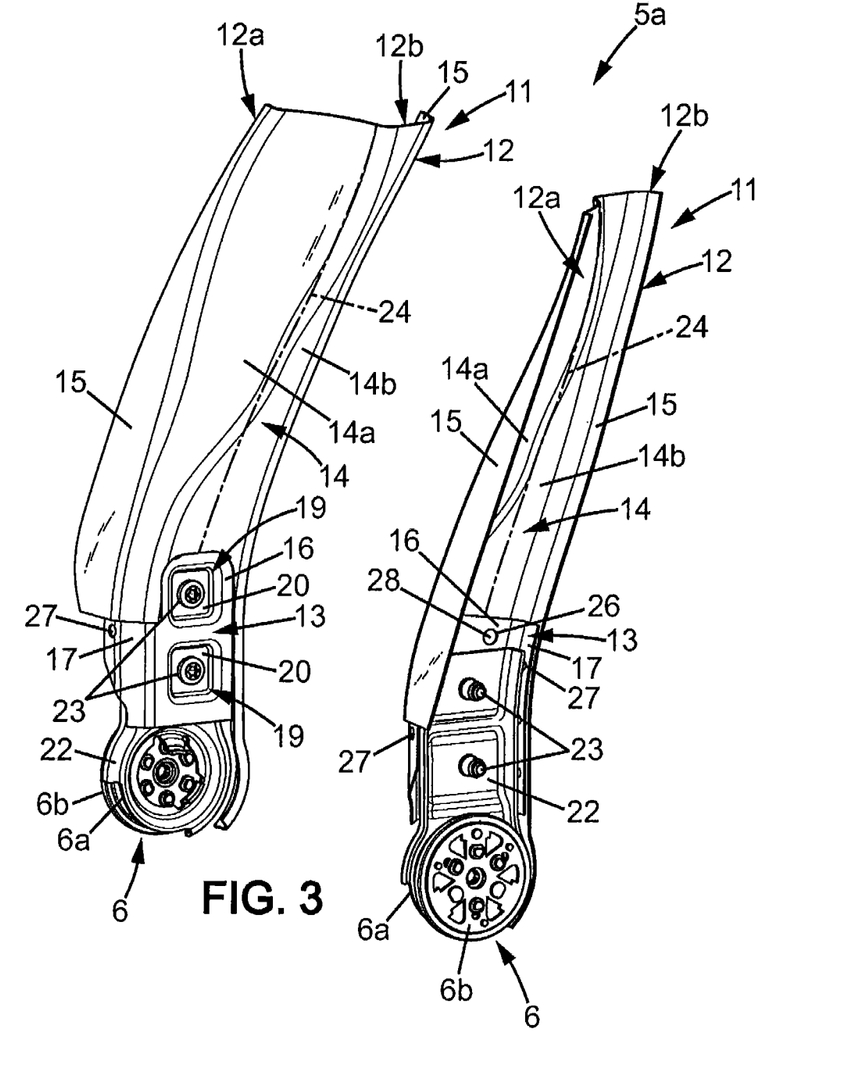
FIG. 3 is an exploded perspective view showing the rigid reinforcements and the hinge mechanisms of the two sides of the seat backrest.

As represented in FIGS. 2, 2a and 3, each of the lateral edges 10 of the shell of plastic material is overmolded onto a rigid lateral reinforcement 11 which consists of a rigid insert 12 of composite material and a metal plate 13.

The insert 12 is made of a composite material comprising resistant fibers, for example carbon fibers, embedded in a synthetic matrix such as a thermoplastic for example.

The insert 12 may be of continuous fiber reinforced thermoplastic (CFRT). Each insert 12 may, for example, have a substantially U-shaped cross-section, with a core 14 substantially perpendicular to the mean plane of the backrest and two side flanges 15 extending perpendicular to the core 14, for example outwards from the backrest.

Each insert 12 of composite material extends longitudinally for a length representing the major portion of the height of the corresponding lateral edge 10 of the shell of plastic material, extending from the lower end of said lateral edge to close to the upper end of said lateral edge in the example considered here.

As can be seen in FIGS. 2a and 3, each plate 13 also has a U-shaped cross-section, with a core 16 partially superimposed on the core 14 of the corresponding composite insert, and two side flanges 17 partially superimposed on the side flanges 15 of the corresponding composite insert, the metal plate 13 being arranged for example inside the U-shaped cross-section formed by the composite insert 11, meaning towards the outside of the backrest in the example represented in the drawings.

Each plate 13 is integrally attached to the corresponding composite insert 12, in particular by riveting, as will be explained below. In addition, as one can see in FIG. 2a, each lateral reinforcement 11 is also overmolded by the corresponding lateral edge 10 of the shell of plastic material, which covers the major portion of each composite insert 12 (with the possible exception of certain areas 18 that are left free, visible in FIG. 2) and each metal plate 13.

The metal plates 13 may possibly comprise attachment areas 19, visible in FIGS. 2, 2a and 3, which are not covered by the plastic material of the shell 8. These attachment areas 19 may, for example, be formed by locally stamping bosses in the core 16 of the plates 13, and each may have, for example, two metal support surfaces 20, 21 not covered by the plastic material, on each face of the core 16 of each metal plate 13.

As one can see in FIGS. 2, 2a and 3, the support surfaces 21 may serve as a support for the metal tabs 22 which are integrally attached to one of the plates 6a of the corresponding hinge mechanism 6, the other plate 6b of said hinge mechanism being fixed to the seat portion 2 of the seat. Each metal tab 22 extends substantially parallel to the core 16 of the corresponding metal plate 13 and may be attached to the metal plate 13 by a screwing attachment for example, in particular using bolts 23 which are supported by the support surfaces 20 and the external side of the corresponding metal tab 22.

Figure 4:
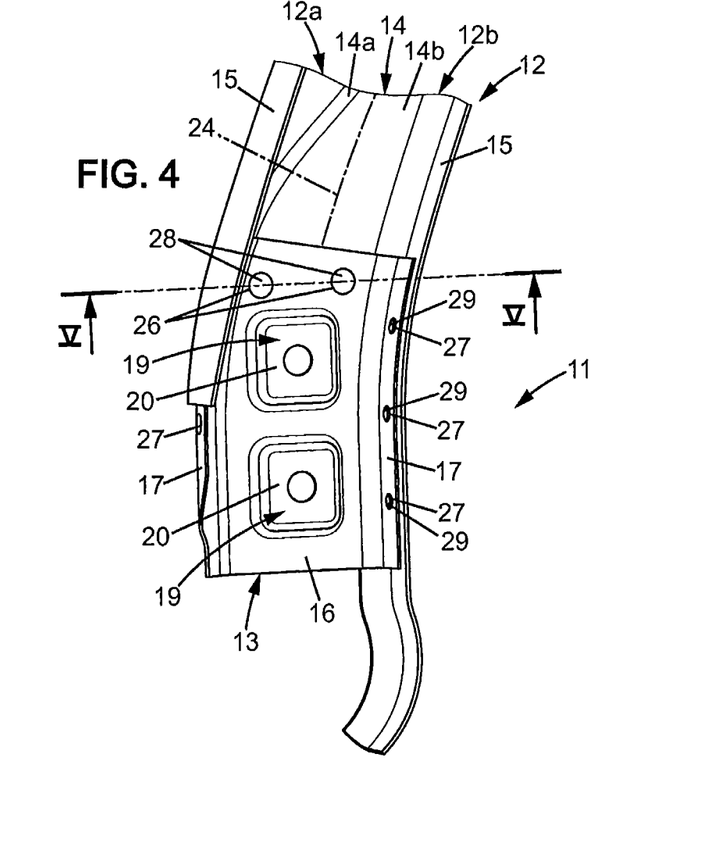
FIG. 4 is a detailed exploded perspective view showing the lower portion of one of the lateral reinforcements of FIG. 3.
Figure 5:
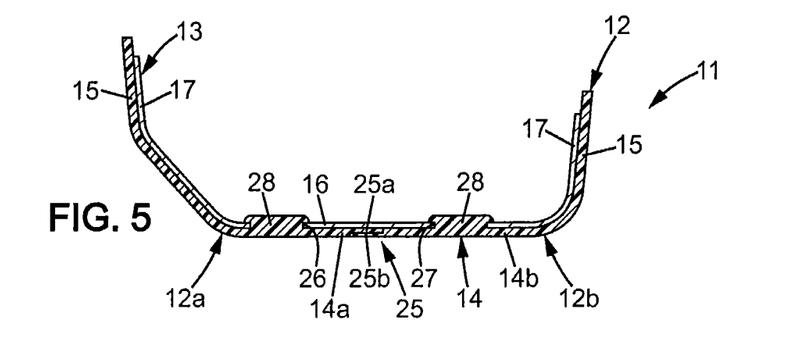
FIG. 5 is a cross-sectional view along the line V-V in FIG. 4.

As can be seen in FIGS. 4 to 7, each composite insert 12 is made of two composite parts 12a, 12b, each one having a substantially L-shaped cross-section and each one forming one of the side flanges 15 of the composite insert 12 and a respective portion 14a, 14b, of the insert core 14 of the composite insert. The two parts 14a, 14b of the core 14 are assembled together along a joining line 24 which extends for the entire height of the core 14. Preferably, as represented in FIG. 5, the two composite parts 12a, 12b are assembled together by fusion of their component composite material, in an overlapping area 25.

Figure 6:
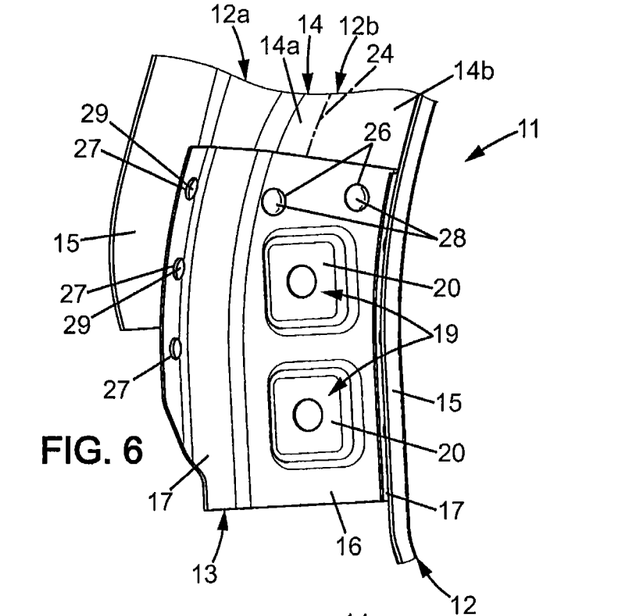
FIG. 6 is a view similar to FIG. 4, showing a portion of the lateral reinforcement of FIG. 4 viewed from another angle.
Figure 7:
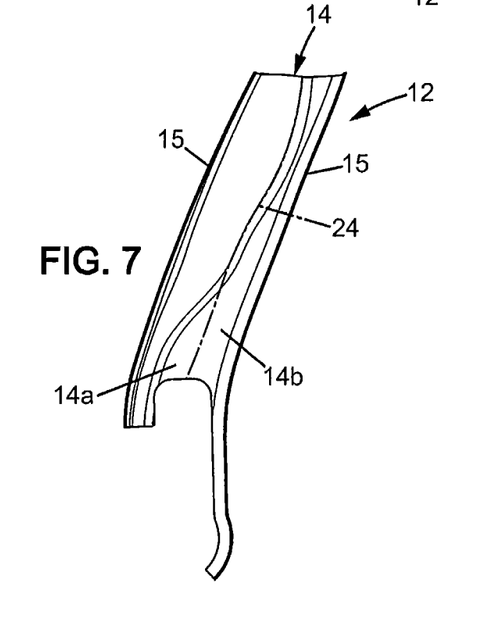
FIG. 7 is a side view showing an insert of composite material that is part of the lateral reinforcement of FIGS. 4 to 6.

This overlapping area may be formed by two overlapping strips 25a, 25b that are respectively part of the two core portions 14a, 14b and which are superimposed on each other and joined by hot pressing, as will be explained below. In addition, as can be seen in FIGS. 4, 5 and 6, the metal plate 13 may have recesses 26 in its core 16 in the area of its two side flanges 17. These recesses 26, 27 contribute to integrally attaching the two composite parts 12a, 12b to the plate 13, by the riveting 28, 29 formed by penetration of the material of the composite parts 12a, 12b into said recesses 26, 27. Such riveting is obtained by the creep of the material of the composite parts 12a, 12b, by gluing, or by pressing in a hot mold, as will be explained below.

To summarize, the mutual attachment of the two composite parts 12a, 12b can therefore be obtained here by three complementary means:

the overmolding of the lateral edges 10 of the shell of plastic material,
the fusion of the two composite parts 12a, 12b at the overlapping strips 25a, 25b,
and riveting 28, 29.

If necessary, the integral attachment of the two composite parts 12a, 12b may be obtained by only one or only some of these means, or by any other means of attachment.

Figure 8:
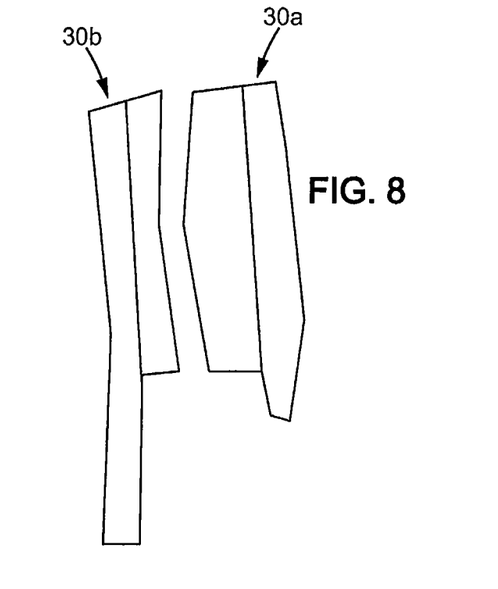
FIG. 8 is a schematic view showing two composite blanks to be used in forming the insert of composite material of FIG. 7 after molding and assembly.
Figure 9:
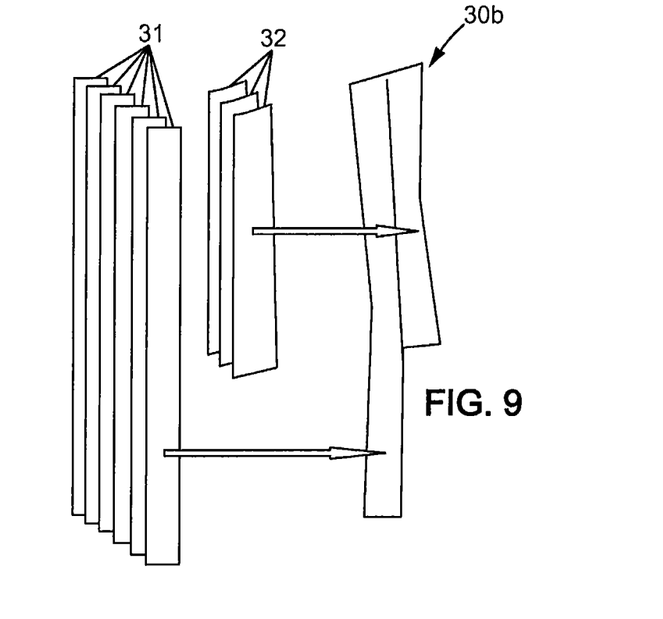
FIGS. 9 and 10 are schematic views illustrating the composition of the two composite blanks of FIG. 8, FIGS. 11 and 12 are basic diagrams illustrating the hot molding of the two composite blanks of FIG. 8.
Figure 10:
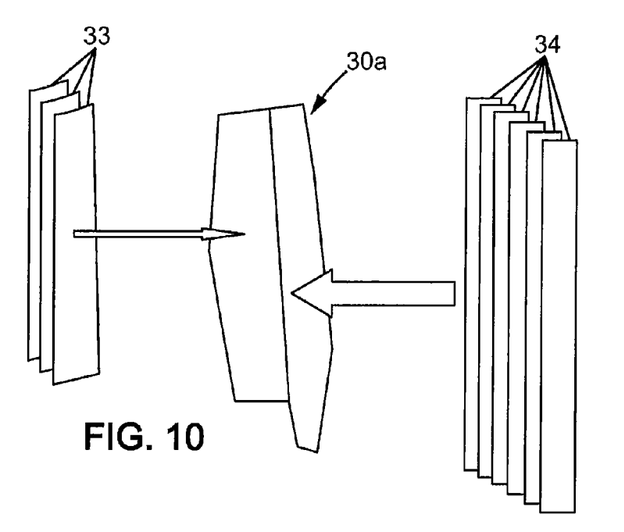

As represented in FIGS. 8 to 10, each of the composite parts 12a, 12b, constituting each composite insert 12, is made from a respective blank 30a, 30b consisting of a stack of sheets 31-34 of composite material. Each of the sheets 31-34 of composite material may have reinforcing fibers oriented in a predetermined direction, for example parallel to the longitudinal direction of the composite part or transverse to it. Sheets of composite material having different fiber orientations may be superimposed in predetermined sequences, in a manner that maximizes the mechanical strength of the composite parts 12a, 12b ultimately obtained in order to be suitable for the stresses they are intended to withstand.

Figure 11:
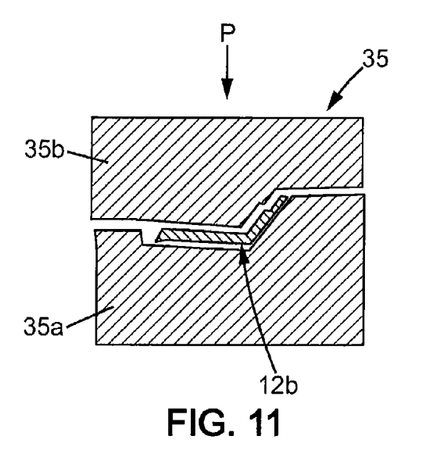
Figure 12:
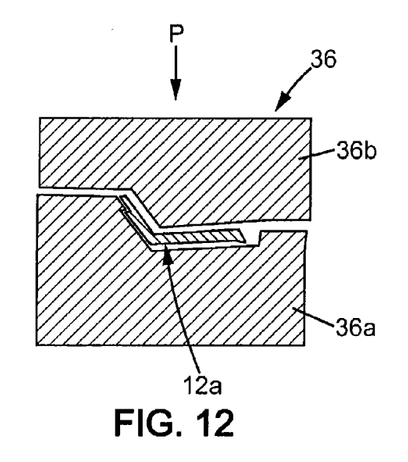

As represented in FIGS. 11 and 12, the blanks 30a, 30b may be pressed in hot molds 35, 36 in a manner that assembles together the sheets of composite material 31, 32 to form the composite part 12b and the sheets 33, 34 to form the composite part 12a. The molds 35, 36 conventionally consist of two parts, respectively 35a, 35b and 36a, 36b, one 35a, 36a being fixed and the other 35b, 36b being movable in the pressing direction P. Advantageously, the molds 35, 36 are shaped so that the side flanges 15 of the two composite parts 12a, 12b are arranged substantially perpendicular to the pressing direction P, while the core portions 14a, 14b are arranged to form a relatively small angle in relation to the pressing direction P. The molds 35, 36 may for example be initially heated to a temperature of 80° C. when the blanks 30a, 30b are put in place, after which the molds are closed and allowed to cool during the pressing.

Thus the fibers of the side flanges 15, said flanges being the portions of the composite parts 12a, 12b which undergo the most stress, are not rearranged during the pressing and retain their optimal mechanical properties. Any rearrangement of the fibers which could occur in the core portions 14a, 14b during the hot pressing are less of a problem because the core 14 of the rigid insert 12 is the portion of this rigid insert which is subjected to the least mechanical stress.

Figure 13:
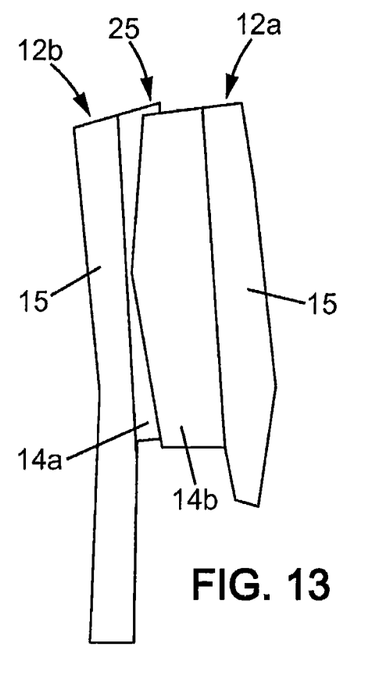
FIG. 13 is a schematic view illustrating the partially overlapping assembly of the two composite parts issuing from the molding illustrated in FIGS. 11 and 12, and FIGS. 14 to 16 are basic diagrams illustrating some variants of the assembly of FIG. 13.
Figure 14:
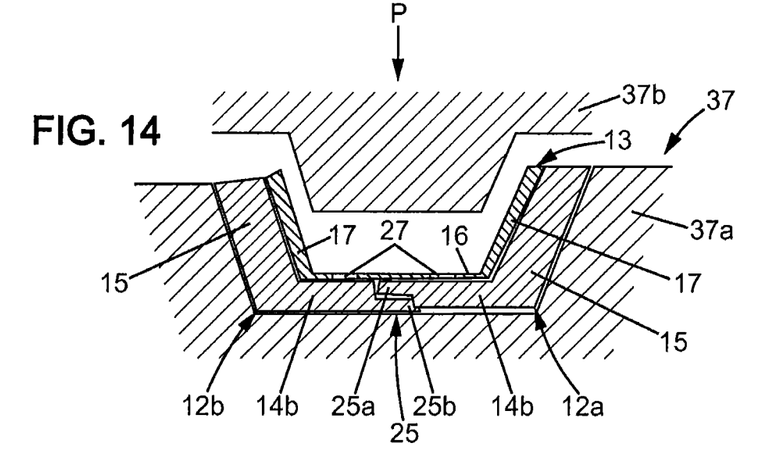

After the composite parts 12a, 12b have been created by pressing in hot molds, these two parts are arranged in a hot mold 37 (previously heated for example to 80° C.), visible in FIG. 14, so that their overlapping strips 25a, 25b are superimposed atop one another, as represented in FIGS. 13 and 14. In addition, the plate 13 is also placed in the mold 37, then the two parts 37a, 37b of the mold 37 are pressed against each other in the pressing direction P which is substantially perpendicular to the core 14 of the insert. The heating of the mold is discontinued when it is closed, and the pressing is maintained while the mold cools. During this pressing operation, the abovementioned riveting 28, 29 is formed by the creep of the thermoplastic matrix of the composite into the recesses 26, 27 of the plate 13.

Figure 15:
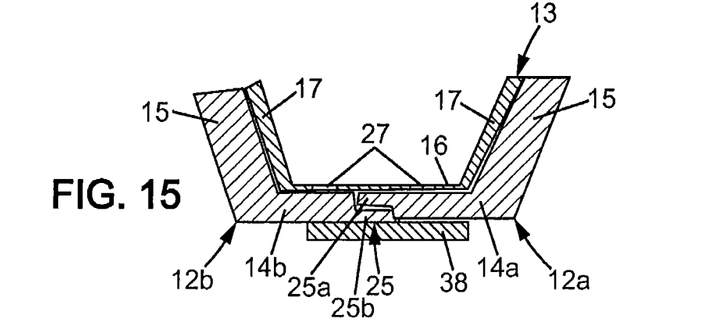

In a variant represented in FIG. 15, the assembly of the composite parts 12a, 12b can be reinforced by providing at least one supplemental composite sheet 38, which at least partially covers the core portions 14a, 14b of the two composite parts, for example on the side opposite the one attached to the plate 3. This layer 38 is then at least partially fused with the two core portions 14a, 14b during the abovementioned pressing of the hot mold 37.

Figure 16:
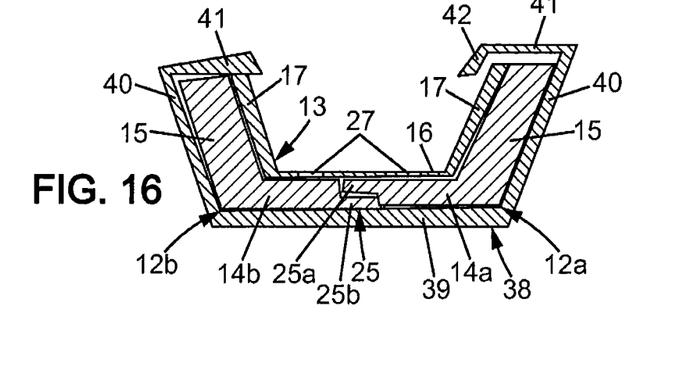

In addition, as represented in FIG. 16, said composite sheet 38 may also cover the side flanges of the insert. In this case, the composite layer 38 may comprise a core 39 covering the core 14 of the insert 12 opposite the plate 13, two side flanges 40 covering the external side of the side flanges 15, and possibly two flaps 41 folded over the free edges of the side flanges 15 and 17, opposite the core 14 of the insert. These flaps 14, or one of them, may additionally be extended by a fold 42 of the composite sheet 38, which partially covers the inner face of the corresponding side flange 17 of the plate 1. The assembly represented in FIG. 16 is then hot pressed into the abovementioned mold 37.

One will note that the invention, described above for its application to the backrest of a seat, is also applicable to the seat portion. In this case, the shell 8 of plastic material would form the supporting framework of the seat portion and the lateral edges of the shell 8 of plastic material would extend along the respective sides of the seat portion between a first end (the front end) close to the hinge mechanism 6 and a second end further away from said hinge mechanism, and each rigid insert 12 of composite material would be overmolded by one of the two lateral edges 10 of the shell of plastic material, each rigid insert 12 extending for a certain length from the first end of said corresponding lateral edge. In this case as well, the core 14 of the insert 12 would be substantially perpendicular to the mean plane of the seat portion and the side flanges 15 substantially parallel to the mean plane of the seat portion, said core 14 being connected to the hinge mechanism 6 at the first end of the corresponding lateral edge.

The invention claimed is:

1. A vehicle seat comprising a seat portion and a backrest connected to the seat portion by at least one hinge mechanism to allow adjusting the tilt of the backrest and to lock the backrest into the selected tilt angle, the seat comprising a seat element chosen from among the backrest and the seat portion, said seat element extending along a mean plane and having two sides, and said seat element comprising:

a shell of plastic material, having two lateral edges which respectively extend along the sides of the seat element between a first end near the hinge mechanism and a second end further from said hinge mechanism, at least one rigid insert of composite material overmolded by one of the two lateral edges of the shell of plastic material, said rigid insert extending for a certain length from the first end of said corresponding lateral edge, said insert comprising resistant fibers embedded in a synthetic matrix, and said insert presenting a U-shaped cross-section having a core substantially perpendicular to the mean plane of the seat element and two side flanges substantially parallel to the mean plane of the seat element, said core being connected to said hinge mechanism at the first end of the corresponding lateral edge, wherein said insert is formed of two composite parts integrally attached to each other, each of said two composite parts having an L-shaped cross-section and comprising a core portion that is part of the core of the insert and one of the flanges of the insert, each of the two core portions extending for substantially the entire height of the core of the insert, and at least one metal plate which at least partially covers the core portions of the two composite parts and which is integrally attached to said two composite parts, said metal plate being overmolded by the corresponding lateral edge of the shell of plastic material and being connected to the hinge mechanism wherein the metal plate comprises recesses facing the two core portions of the two composite parts and is integrally attached to each of said core portions by the riveting formed by the penetration of the material of these core portions into said recesses.

2. The seat according to claim 1, wherein the two distinct composite parts are integrally attached to each other by the shell of plastic material, which is overmolded onto said two distinct composite parts.

3. The seat according to claim 1, wherein the two distinct composite parts are integrally attached to each other along a joining line between the core portions of the two distinct composite parts, said core portions being fused together along said joining line.

4. The seat according to claim 3, wherein the two distinct composite parts each have an overlapping strip, the two strips being superimposed atop one another and assembled together along said joining line, said two strips being fused together along said joining line.

5. The seat according to claim 1, wherein the two distinct composite parts are integrally attached to each other by at least one composite sheet which at least partially covers the core portions of the two distinct composite parts and the side flanges of the insert.

6. The seat according to claim 1, additionally comprising at least one metal plate which at least partially covers the core portions of the two distinct composite parts and which is integrally attached to said two distinct composite parts, said metal plate being overmolded by the corresponding lateral edge of the shell of plastic material and being connected to the hinge mechanism.

7. The seat according to claim 1, wherein the metal plate at least partially covers the core and the two side flanges of the insert and is also integrally attached to said side flanges by riveting formed by the penetration of the material of these side flanges into recesses presented by the metal plate facing said side flanges.

8. The seat according to claim 6, wherein the metal plate is integrally attached, by a screwing attachment, to a rigid tab that is part of the hinge mechanism, said metal plate having at least one support surface not encased by the shell of plastic material and the tab of the hinge mechanism being supported on said support surface.

9. A method for manufacturing a seat element for a vehicle seat, the vehicle seat having a seat portion and a backrest connected to the seat portion by at least one hinge mechanism to allow adjusting the tilt of the backrest and to lock the backrest into the selected tilt angle, the vehicle seat having the seat element chosen from among the backrest and the seat portion, said seat element extending along a mean plane and having two sides, the method comprising the steps of:

forming two distinct composite parts by hot pressing, wherein each of said two distinct composite parts has an L-shaped cross-section and comprises a core portion and only one flange;

assembling the two distinct composite parts together by their respective core portions to form said at least one rigid insert, said rigid insert extending for a certain length from a first end of a corresponding lateral edge, said rigid insert comprising resistant fibers embedded in a synthetic matrix, and said insert presenting a U-shaped cross-section having a core substantially perpendicular to the mean plane of the seat element and two side flanges substantially parallel to the mean plane of the seat element, said core being connected to said hinge mechanism at the first end of the corresponding lateral edge, said core portions of the two distinct composite parts being part of the core of the insert, each of the flanges of the two distinct composite parts forming a different one of the two side flanges of the insert, each of the two core portions extending for substantially the entire height of the core of the insert; and overmolding a shell of plastic material on said at least one rigid insert, said shell of plastic material molded in one piece so as to extend substantially on the entire width of the seat element and having two lateral edges which respectively extend along the sides of the seat element between the first end near the hinge mechanism and a second end further from said hinge mechanism.

10. The method according to claim 9, wherein forming two distinct composite parts by hot pressing, each distinct composite part is manufactured by shaping a blank comprising superimposed composite sheets, by pressing the blank into a hot mold which comprises two mold parts which can be moved towards each other in a pressing direction, the side flange of the distinct composite part molded in this manner being substantially perpendicular to said pressing direction.

11. The method according to claim 9, wherein, assembling the two distinct composite parts together by their respective core portions to form said at least one rigid insert, the two distinct composite parts are arranged so that their core portions are partially superimposed in a certain overlapping area and said core portions are fused together in said overlapping area by pressing in a hot mold.

12. The method according to claim 9, wherein, assembling the two distinct composite parts together by their respective core portions to form said at least one rigid insert, the two distinct composite parts are superimposed with a metal plate which comprises recesses and which at least partially covers said two distinct composite parts, and the two distinct composite parts are assembled together while the material of the distinct composite parts flows into recesses in the metal plate, by pressing in a hot mold.

* * * * *